(12) United States Patent
Mehanna et al.

(10) Patent No.: US 8,700,654 B2
(45) Date of Patent: Apr. 15, 2014

(54) DYNAMIC SPELLING CORRECTION OF SEARCH QUERIES

(75) Inventors: Hussein Mohamed Mehanna, Redmond, WA (US); Andrey Proskurin, Bellevue, WA (US); Tabreez Govani, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 162 days.

(21) Appl. No.: 13/231,049

(22) Filed: Sep. 13, 2011

(65) Prior Publication Data
US 2013/0066896 A1 Mar. 14, 2013

(51) Int. Cl.
*G06F 7/00* (2006.01)
*G06F 17/30* (2006.01)

(52) U.S. Cl.
USPC .......................................... 707/767; 707/719

(58) Field of Classification Search
USPC ................ 707/765, 766, 767, 719, 722, 723, 707/999.003
See application file for complete search history.

(56) References Cited

U.S. PATENT DOCUMENTS

| | | |
|---|---|---|
| 6,424,983 B1 | 7/2002 | Schabes et al. |
| 7,296,019 B1 | 11/2007 | Chandrasekar et al. |
| 2006/0190447 A1 | 8/2006 | Harmon et al. |
| 2009/0249198 A1 | 10/2009 | Davis et al. |
| 2011/0295840 A1* | 12/2011 | Ciaramita et al. ............ 707/719 |

OTHER PUBLICATIONS

Duan, et al., "Online Spelling Correction for Query Completion", In Proceedings of the 20th International Conference on World Wide Web, Mar. 28-Apr. 1, 2011, 10 pages.
Martins, et al., "Spelling Correction for Search Engine Queries", In Proceedings España for Natural Language Processing, 2004, 12 pages.
Wang, et al., "A Fast and Accurate Method for Approximate String Search", In Proceedings of the 49th Annual Meeting of Association for Computational Linguistics, 2011, 10 pages.
Yossef, et al., "Context-Sensitive Query Auto-Completion", In Proceedings of the 20th International Conference on World Wide Web, Mar. 28-Apr. 1, 2011, 10 pages.

* cited by examiner

*Primary Examiner* — Usmaan Saeed
*Assistant Examiner* — Md. I Uddin
(74) *Attorney, Agent, or Firm* — Shook Hardy & Bacon, LLP

(57) ABSTRACT

Methods, computer systems, and computer-readable storage media for dynamically correcting misspelled search queries are provided. A portion of a search query is received, and a data store is accessed. It is determined that the portion of the search query is absent from the data store and, thus, comprises a misspelled portion of a search query. Correctly spelled portions of search queries are dynamically determined for the misspelled portion of the search query using a trie data structure, and the misspelled portion of the search query is associated with the correctly spelled portions of search queries. Search suggestions are determined for the correctly spelled portions of search queries and are ranked based on a frequency of use and on a transformation cost of associating the misspelled portion of the search query with the correctly spelled portion of search queries. The ranked search suggestions are provided to a user.

19 Claims, 8 Drawing Sheets

DYNAMIC SPELLING CORRECTION OF SEARCH QUERIES

BACKGROUND

Typically, when a user misspells a search query, the search engine provider compares the misspelled search query with frequently encountered misspelled search queries stored in a query log. In turn, the frequently encountered misspelled search queries are associated with their correctly spelled search query counterparts in the query log. If the misspelled search query matches one of the frequently encountered misspelled search queries in the query log, the misspelled search query is associated with the correctly spelled search query counterpart, and a set of search suggestions is returned to the user. This method works fairly well with commonly misspelled search queries whether they are complete search queries or portions of search queries. However, this process fails to correct search queries with misspellings that are not in the query log. The result is a loss of opportunity in presenting the user with potentially relevant search suggestions that would have been delivered if the misspelling had not occurred.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable storage media for, among other things, dynamically correcting the spelling of a misspelled portion of a search query. In brief and at a high level, a portion of a search query is received, and it is determined that the portion of the search query is absent from a data store; the data store comprises misspelled search queries and correctly spelled search queries. Based on this determination, it is ascertained that the portion of the search query is misspelled. It is dynamically determined that the misspelled portion of the search query is capable of being modified to a correctly spelled portion of a search query by changing one or more of the characters that comprise the misspelled portion of the search query. A transformation cost for modifying the characters is ascertained, and, if the transformation cost is below a predetermined threshold, the misspelled portion of the search query is associated with the correctly spelled portion of a search query. One or more search suggestions are determined for the correctly spelled portion of a search query, and the search suggestions are ranked based on a frequency of use of the search suggestions and the transformation cost.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems, methods, and computer-readable storage media for, among other things, dynamically correcting misspelled portions of search queries. In brief and at a high level, a portion of a search query is received, and it is determined that the portion of the search query is absent from a data store; the data store comprises commonly encountered misspelled search queries and correctly spelled search queries. Based on this determination, it is ascertained that the portion of the search query is misspelled. Next, it is dynamically determined that the misspelled portion of the search query is capable of being modified to a correctly spelled portion of a search query by changing one or more of the characters that comprise the misspelled portion of the search query. As used throughout this application, the term "dynamic" means a process occurring in real-time in an online setting. A transformation cost for modifying the characters is ascertained, and, if the transformation cost is below a predetermined threshold, the misspelled portion of the search query is associated with the correctly spelled portion of a search query. One or more search suggestions are determined for the correctly spelled portion of a search query, and the search suggestions are ranked based on a frequency of use of the search suggestions and the transformation cost. The search suggestions are subsequently provided to a search engine page.

Figure 1:
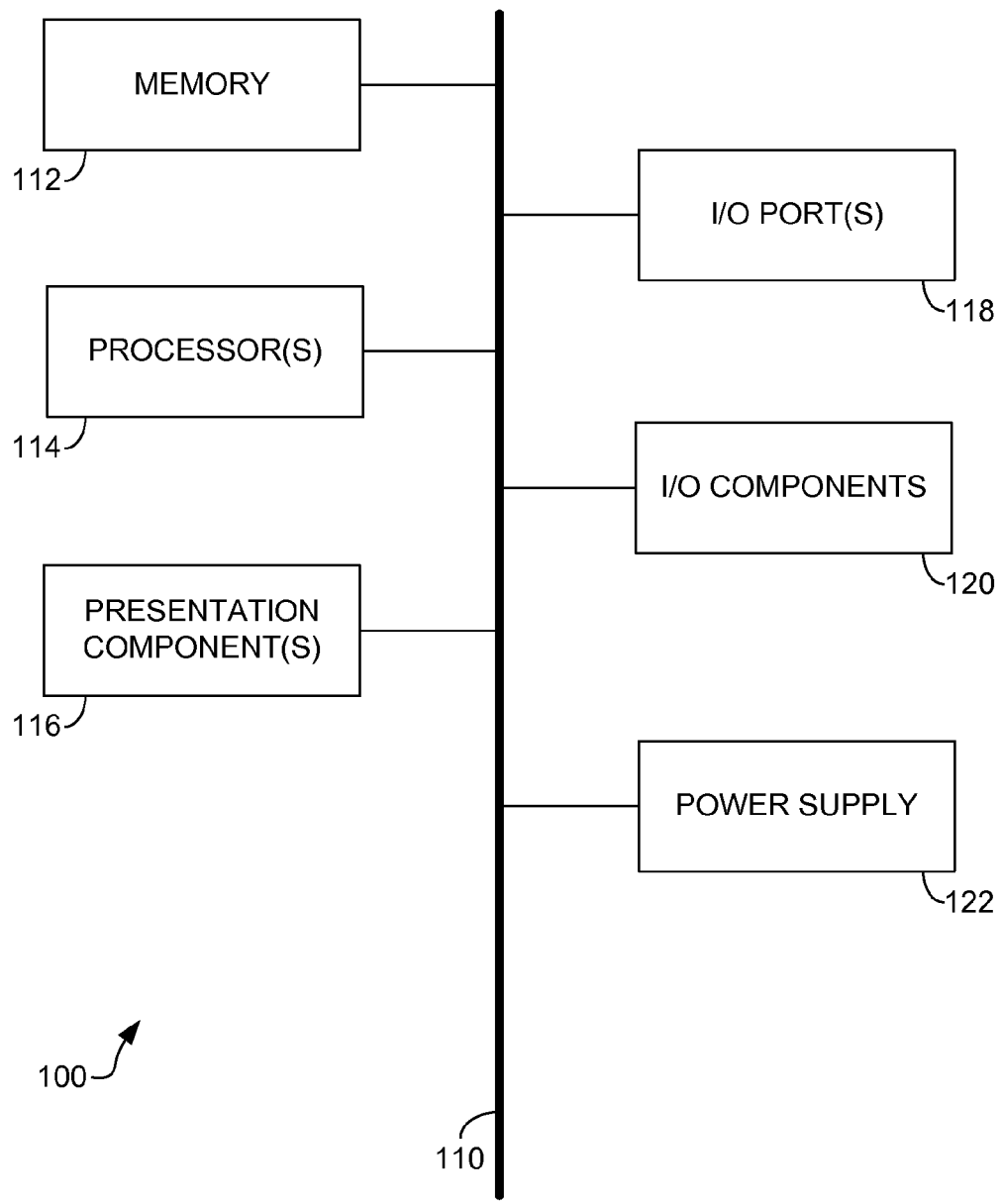
FIG. 1 is a block diagram of an exemplary computing environment suitable for use in implementing embodiments of the present invention.

An exemplary computing environment suitable for use in implementing embodiments of the present invention is described below in order to provide a general context for various aspects of the present invention. Referring to FIG. 1, such an exemplary computing environment is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "server" is often used herein, it will be recognized that this term may also encompass a search engine, a set of one or more processes distributed on one or more computers, one or more stand-alone storage devices, a set of one or more other computing or storage devices, a combination of one or more of the above, and the like.

Figure 2:
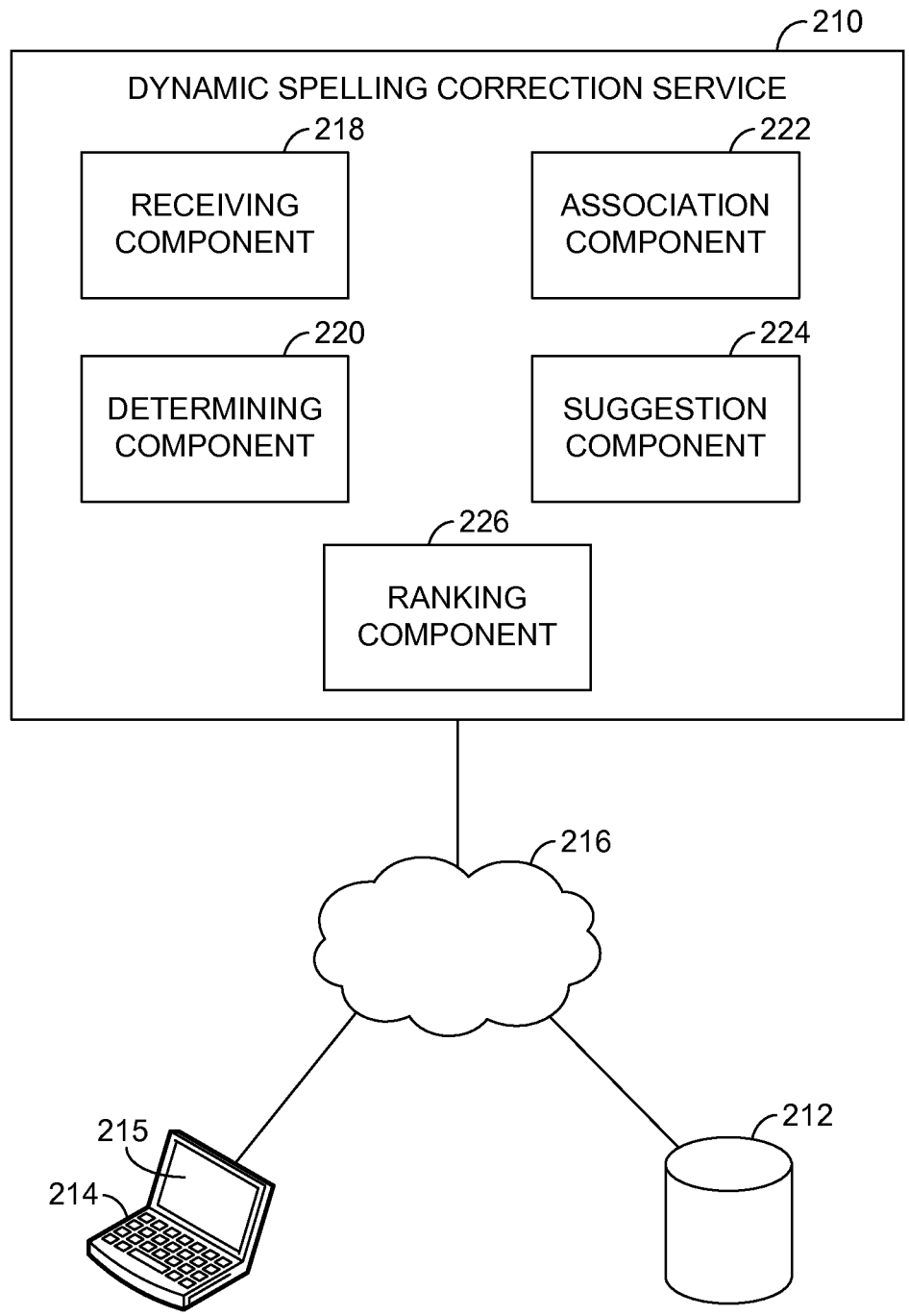
FIG. 2 is a block diagram of an exemplary system for dynamically correcting misspelled portions of search queries suitable for use in implementing embodiments of the present invention.

With this as a background and turning to FIG. 2, an exemplary computing environment 200 is depicted for use in dynamically correcting misspelled portions of search queries. The computing system environment 200 is merely an example of one suitable computing system environment and is not intended to suggest any limitation as to the scope of use or functionality of embodiments of the present invention. Neither should the computing system environment 200 be interpreted as having any dependency or requirement related to any single module/component or combination of modules/components illustrated therein.

The computing system environment 200 includes a dynamic spelling correction service 210, a data store 212, and an end-user computing device 214 all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

In some embodiments, one or more of the illustrated components/modules may be implemented as stand-alone applications. In other embodiments, one or more of the illustrated components/modules may be integrated directly into, for example, the operating system of the end-user computing device 214 or the dynamic spelling correction service 210. The components/modules illustrated in FIG. 2 are exemplary in nature and in number and should not be construed as limiting. Any number of components/modules may be employed to achieve the desired functionality within the scope of embodiments hereof. Further, components/modules may be located on any number of servers. By way of example only, the dynamic spelling correction service 210 might reside on a server, a cluster of servers, or a computing device remote from one or more of the remaining components. Further, the dynamic spelling correction service 210 may be associated with a search engine provider.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The data store 212 is configured to store information for use by, for example, the dynamic spelling correction service 210. The information stored in association with the data store 212 is configured to be searchable for one or more of the items of information stored in association therewith. The information stored in association with the data store 212 may comprise general information used by the dynamic spelling correction service 210. For example, the data store 212 may store information concerning correctly spelled complete search queries, correctly spelled portions of search queries, misspelled complete search queries, misspelled portions of search queries, as well as search suggestions. In one aspect, the misspelled search queries (whether complete or a portion of) may comprise misspelled search queries that are commonly encountered by search engine providers.

Further, the data store 212 may store data structures that indicate relationships between items of information in the data store 212. For example, the data store 212 may store relationships between a misspelled search query and one or more correctly spelled portions of search queries that are similar to the misspelled search query. By way of illustrative example, the commonly misspelled search query "hme" may be associated with the correctly spelled search query "home." Another type of relationship stored in the data store 212 comprises relationships between a correctly spelled search query and one or more search suggestions. Using the example given above, the correctly spelled search query "home" may be associated with search suggestions such as "home building," "home decorating," "home refinancing," and the like. The content and volume of such information in the data store 212 are not intended to limit the scope of embodiments of the present invention in any way. Further, though illustrated as a single, independent component, the data store 212 may, in fact, be a plurality of storage devices, for instance, a database cluster, portions of which may reside on the dynamic spelling correction service 210, the end-user computing device 214, and/or any combination thereof.

The end-user computing device 214 shown in FIG. 2 may be any type of computing device, such as, for example, the computing device 100 described above with reference to FIG. 1. By way of example only and not limitation, the end-user computing device 214 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof.

As shown, the end-user computing device 214 includes a display screen 215. The display screen 215 is configured to display information to the user of the end-user computing device 214. For instance, the display screen 215 may display a user interface associated with a search engine page with a search query box. The display screen 215 may also display a list of search suggestions to the user.

The computing system environment 200 is merely exemplary. While the dynamic spelling correction service 210 is illustrated as a single unit, it will be appreciated that the dynamic spelling correction service 210 is scalable. For example, the dynamic spelling correction service 210 may in actuality include a plurality of computing devices in communication with one another. Moreover, the data store 212, or portions thereof, may be included within, for instance, the dynamic spelling correction service 210 as a computer-storage medium. The single unit depictions are meant for clarity, not to limit the scope of embodiments in any form.

As shown in FIG. 2, the dynamic spelling correction service 210 comprises a receiving component 218, a determining component 220, an association component 222, a suggestion component 224, and a ranking component 226. In some embodiments, one or more of the components 218, 220, 222, 224, and 226 may be implemented as stand-alone applications. In other embodiments, one or more of the components 218, 220, 222, 224, and 226 may be integrated directly into the operating system of a computing device such as the computing device 100 of FIG. 1. It will be understood that the components 218, 220, 222, 224, and 226 illustrated in FIG. 2 are exemplary in nature and in number and should not be construed as limiting. Any number of components may be employed to achieve the desired functionality within the scope of embodiments hereof.

The receiving component 218 is configured to receive (via the network 216) a portion of a search query from a user (for example, the user of the end-user computing device 214). The portion of the search query received from the user may be received via the user inputting the portion of the search query using a keyboard (for example, the keyboard associated with the end-user computing device 214). The layout of the keyboard may comprise a QUERTY layout but may also include alternative layouts. The portion of the search query may be inputted in a variety of ways including typing, audio inputs, pointing devices, composite devices, and the like.

The portion of the search query comprises one or more characters. For example, the portion of the search query may comprise a first character and one or more additional characters that follow the first character. The portion of the search query received by the receiving component 218 may comprise a prefix to a search query, one word of a search query, or a complete search query. The portion of the search query may be correctly spelled, or it may be misspelled. Further, the misspelling may be due to a typographical error that occurs when the user is inputting the portion of the search query using a keyboard. Any and all such variations are within the scope of embodiments of the present invention.

The receiving component 218 is also configured to access the data store 212 to determine if the portion of the search query received by the receiving component 218 is misspelled (a search query that is misspelled is hereinafter known as a misspelled portion of a search query). The receiving component 218 may determine that the portion of the search query is a misspelled portion of a search query in need of dynamic correction by accessing the data store 212 and determining that the portion of the search query is not related to a misspelled portion of a search query or a correctly spelled portion of a search query stored in the data store 212. Further, if the portion of the search query received by the receiving component 218 is not related to misspelled portions of search queries stored in the data store 212, the receiving component 218 may determine that the portion of the search query comprises an infrequently encountered misspelling in need of dynamic correction as outlined below.

In one aspect of the invention, the receiving component 218 is configured to access the data store 212 to determine that the portion of the search query is associated with a set of search suggestions. Further, the receiving component 218 is configured to determine that the set of search suggestions is less than a predetermined number such as, for example, less than ten. If the set of search suggestions is less than the predetermined number, the receiving component 218 determines that the portion of the search query may also be a misspelled portion of a search query. By way of illustrative example, the receiving component receives the search query "prk." Upon accessing the data store 212, the receiving component 218 determines that the search query "prk" is associated with two search suggestions "prk enterprises," and "prk restaurant." Because "prk" is associated with only two search suggestions, the receiving component 218 determines that "prk" may also comprise a misspelled portion of a search query in need of dynamic correction and proceeds accordingly.

The determining component 220 is configured to determine one or more correctly spelled portions of search queries that are similar to the misspelled portion of the search query. The determining component 220 uses a trie data structure to determine the one or more correctly spelled portions of search queries that are similar to the misspelled portion of the search query. In general, the trie data structure is created using data in the data store 212. In one aspect of the invention, the trie data structure encompasses all possible correctly spelled search queries in the data store. For each search query in the data store, a list of possible prefixes are generated and incorporated into the trie data structure. For example, for the search query "banana," possible prefixes may include: "b," "ba," "ban," "bana," and so on. The trie data structure comprises a plurality of nodes and a plurality of paths, where each node represents a character. Further, traversal of any one of the plurality of paths generates, in one aspect, a correctly spelled portion of a search query and/or a correctly spelled complete search query.

Figure 7:
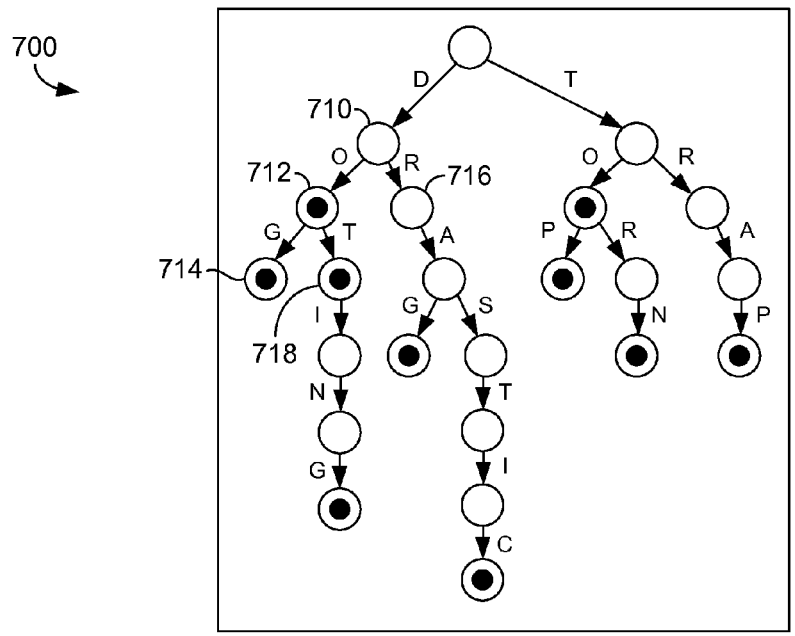
FIG. 7 depicts an exemplary trie data structure used for generating correctly spelled portions of search queries for use in implementing embodiments of the present invention.

FIG. 7 depicts an exemplary portion of a trie data structure, referenced generally by the numeral 700. As can be seen from FIG. 7, each node of the trie data structure 700 represents a character, and the nodes are interconnected by a plurality of paths. The traversal of any one path generates a correctly spelled portion of a search query or a correctly spelled complete search query as illustrated by a solid circle within a node. By way of illustrative example, a user may input a portion of a search query starting with a character "d" 710. Next, the user inputs a second character "o" 712. Starting with the second character 712, a determining component such as the determining component 220 of FIG. 2, determines that the character 712 is capable of being modified to one or more additional characters. This determination may be based on, for example, a distance on a keyboard between the inputted character and the one or more additional characters. This distance is known as an edit distance. For example, using the trie data structure 700, the character 712 is capable of being modified to the character "r" 716. The result is two possible correctly spelled portions of search queries—"do," and "dr." Modification of a character may include adding an additional character, removing the character, or replacing the character with a new character.

Continuing, the user next inputs a character "g" 714. The determining component determines that the character 714 is capable of being modified to, for example, a character "t" 718. Again, this determination may be based on an edit distance between the character 714 and the character 718. The result is two additional possible portions of search queries—"dog," and "dot." This process continues for each additional character that the user inputs. The result of the above process is the generation of one or more correctly spelled portions of search queries.

Although the above process is described as a series of iterative steps for clarity sake, the determining component 220 is configured to simultaneously determine the one or more correctly spelled portions of search queries that are similar to the misspelled portion of the search query. For instance, the determining component 220 is able to make one pass through the trie data structure to generate the one or more correctly spelled portion of search queries.

As mentioned, in one aspect, the trie data structure is created using correctly spelled portions of search queries and correctly spelled complete search queries in the data store. In another aspect of the invention, the trie data structure may be created using the correctly spelled search queries mentioned above and one or more misspelled portions of search queries. The misspelled search queries in the trie data structure may be linked or related to one or more correctly spelled portions of search queries. Thus, when the determining component 220 begins traversing a path that will generate one of the misspelled portions of a search query, the determining component 220 is routed to the related correctly spelled portion of the search query. This process will be explained in greater depth below.

Turning back to FIG. 2, the association component 222 is configured to determine a transformation cost for modifying each character in the misspelled portion of the search query. The transformation cost is a numerical value that is inversely proportional to a probability that the user intended to input a character other than the character in the misspelled portion of the search query. There are several factors that may influence a transformation cost for modifying a character. These factors include an edit distance between the inputted character and the modifying character, character combinations in the misspelled portion of the search query, an amount of punctuation in the misspelled portion of the search query, the presence of numbers in the misspelled portion of the search query, and the like. An additional factor that may influence the transformation cost is the position of a character in the misspelled portion of the search query. For example, a transformation cost for modifying the first one or two characters in the misspelled portion of the search query may be higher (and the probability lower) than a transformation cost for modifying a character that occurs later in the misspelled portion of the search query. This is because it is more unlikely that the user would misspell the first one or two characters of a search query as compared to characters that occur later in the search query.

The association component 222 is also configured to determine if the transformation cost for modifying a character in the misspelled portion of the search query is less than a predetermined threshold. If the transformation cost is less than the predetermined threshold, the association component 222 associates the misspelled portion of the search query with one or more correctly spelled portions of search queries as determined by the determining component 220 using the trie data structure. A threshold is utilized to prevent overcorrecting search queries. For example, if there is a low probability that the user intended to input a different character, the user will likely become frustrated if a different character is substituted for the inputted character.

In one aspect of the invention, the threshold is different depending on a relative position of the character being modified. A predetermined threshold may be less for a character located in a position near a beginning of a search query. This is because modifying the character near the beginning of the search query may substantially alter the meaning of the search query. The portion of the search query "pl," for instance, is substantially different than the inputted portion of the search query "pr." In other words, a lower transformation cost and a higher probability may be needed to modify a character near the beginning of a search query.

On the other hand, a predetermined threshold may be greater for a character located in a position that is relatively far from a beginning of a search query. Modifying a character in this position is unlikely to substantially alter the meaning of the search query. For example, the portion of the search query "playg" is not substantially different from the inputted portion of the search query "playf." In other words, a modification to a character removed from the beginning of the search query tolerates a somewhat higher transformation cost and a somewhat lower probability.

As mentioned above, upon determining that the transformation cost for modifying a character is less than a predetermined threshold, the association component 222 is also configured to associate the misspelled portion of the search query with one or more correctly spelled portions of search queries as determined by the determining component 220.

Once the association component 222 has associated the misspelled portion of the search query with the one or more correctly spelled portions of search queries, the suggestion component 224 is configured to determine search suggestions corresponding to each of the one or more correctly spelled portions of search queries. The search suggestions corresponding to the one or more correctly spelled portions of search queries may be stored, for example, in the data store 212. The suggestion component 224 is also configured to aggregate the search suggestions corresponding to each of the one or more correctly spelled portions of search queries to create an aggregate set of search suggestions.

The ranking component 226 is configured to rank the aggregated set of search suggestions. The search suggestions are ranked based on a frequency of use of the search suggestions and the transformation cost as determined by the association component 222. A search suggestion that is used more frequently by users will be ranked higher by the ranking component 226 than a search suggestion that is not used as frequently. Frequency of use may be determined by, for example, user selections of the search suggestion, user attempts to re-find the search suggestion, user clicks on a uniform resource locator (URL) associated with the search suggestion, and the like.

As mentioned, the ranking component 226 is also configured to rank a search suggestion within the aggregated set of search suggestions based on the transformation cost of associating the misspelled portion of the search query with the correctly spelled portion of the search query that led to the search suggestion. A search suggestion corresponding to a correctly spelled portion of a search query with a low transformation cost (i.e., a high probability that the user intended to input the character in the correctly spelled portion of the search query) will be ranked higher than a search suggestion corresponding to a correctly spelled portion of a search query with a higher transformation cost.

Figure 3:
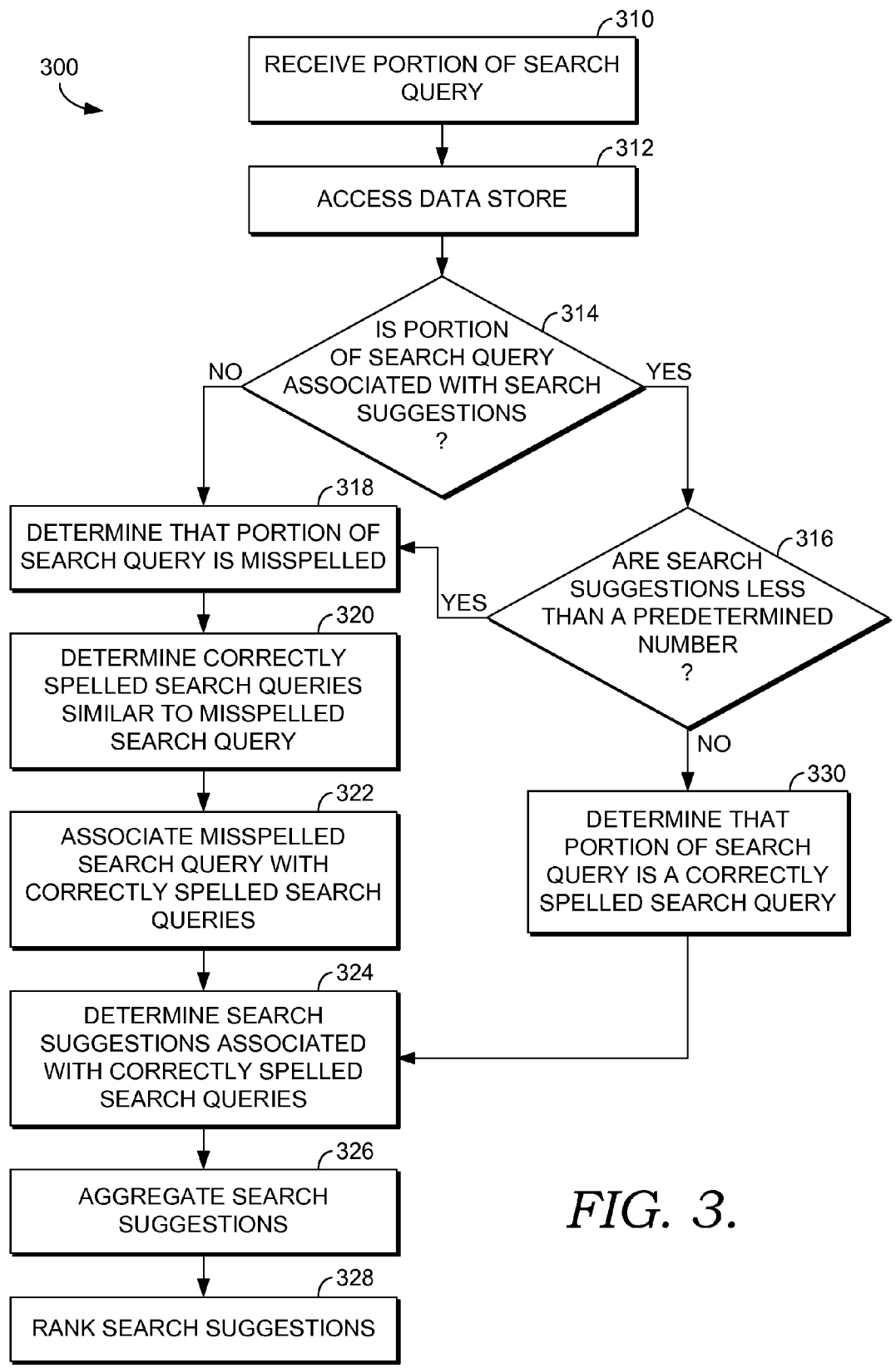
FIG. 3 depicts a flow diagram that illustrates a method of providing relevant search suggestions in accordance with an embodiment of the present invention.

Turning now to FIG. 3, a flow diagram is depicted illustrating a method 300 of disambiguating a portion of a search query. At step 310, a portion of a search query is received by, for example, a receiving component such as the receiving component 218 of FIG. 2. The portion of the search query may comprise a first character followed by one or more additional characters. The portion of the search query may, in one aspect, be a complete search query. At step 312, a data store is accessed by, for example, the receiving component. The data store (for example, the data store 212 of FIG. 2) stores a plurality of search queries and associated search suggestions. The search queries may be complete and/or partial, correctly spelled and/or misspelled.

At step 314, it is determined whether the portion of the search query is associated with a first set of search suggestions in the data store. If the portion of the search query is associated with the first set of search suggestions, then, at step 316, it is determined whether the number of search suggestions within the first set of search suggestions is less than a predetermined number. For example, it may be determined whether the number of search suggestions is less than, for example, ten search suggestions. If the number of search suggestions associated with the portion of the search query is less than the predetermined number then, at step 318, it is determined by the receiving component that the portion of the search query is a misspelled portion of a search query.

Continuing, at step 320, correctly spelled portions of search queries that are similar to the misspelled portion of the search query are determined by a determining component such as, for example, the determining component 220 of FIG. 2. This is accomplished by using a trie data structure. Beginning with at least a second character of the misspelled portion of the search query, one or more correctly spelled portions of search queries are determined using the trie data structure. This process continues for each additional character of the misspelled portion of the search query. The result is a set of correctly spelled portions of search queries.

Next, at step 322, the misspelled portion of the search query is associated with the set of correctly spelled portions of search queries. In one aspect, this is done after determining that a transformation cost for modifying each character beginning with at least the second character in the misspelled portion of the search query is less than a predetermined threshold. As mentioned earlier, the transformation cost is a numerical value that indicates a likelihood or probability that the user intended to input a different character. A high transformation cost is associated with a low probability that the user intended to input a different character and vice versa.

At step 324, a second set of search suggestions associated with the set of correctly spelled portions of search queries is determined by a suggestion component such as the suggestion component 224 of FIG. 2. Each correctly spelled portion of a search query may be associated with one or more search suggestions within the second set of search suggestions.

At step 326, the first set of search suggestions is aggregated with the second set of search suggestions to create a third set of search suggestions. By aggregating the first set of search suggestions and the second set of search suggestions, the user is presented with all possible search suggestions associated with the portion of the search query. This helps to alleviate the problem of overcorrecting search queries. Referring to the example given above, a user inputs the search query "prk." A first set of search suggestions associated with this query includes "prk enterprises" and "prk restaurant." After going through the method 300 outlined above, a second set of search suggestions is determined for the search query "prk." The search suggestions within the second set of search suggestions include "parking garage" and "pride meats." The first and second set of search suggestions are aggregated together to create a third set of search suggestions ("prk enterprises," "prk restaurant," "parking garage," and "pride meats").

At step 328, the third set of search suggestions is ranked by a ranking component such as the ranking component 226 of FIG. 2. The search suggestions within the third set of search suggestions may be ranked based on a frequency of use of the search suggestions and/or a transformation cost associated with the correctly spelled portion of the search query associated with the search suggestion. After ranking, the third set of search suggestions is provided to a search engine page and subsequently presented to the user. For example, the third set of search suggestions may be displayed on a display screen of an end-user computing device such as the end-user computing device 214 of FIG. 2.

If, at step 314, it is determined that the portion of the search query is not associated with a first set of search suggestions, the method 300 proceeds to step 318 where it is determined that the portion of the search query is a misspelled portion of a search query. The method 300 then continues as outlined above.

If, at step 316, it is determined that the number of search suggestions within the first set of search suggestions is greater than the predetermined number then, at step 330, the portion of the search query is determined to be a correctly spelled portion of a search query. In this case, the method proceeds to step 328 where the first set of search suggestions are ranked and subsequently presented to the user. In this case, the first set of search suggestions may be ranked according to standard ranking algorithms.

Figure 4:
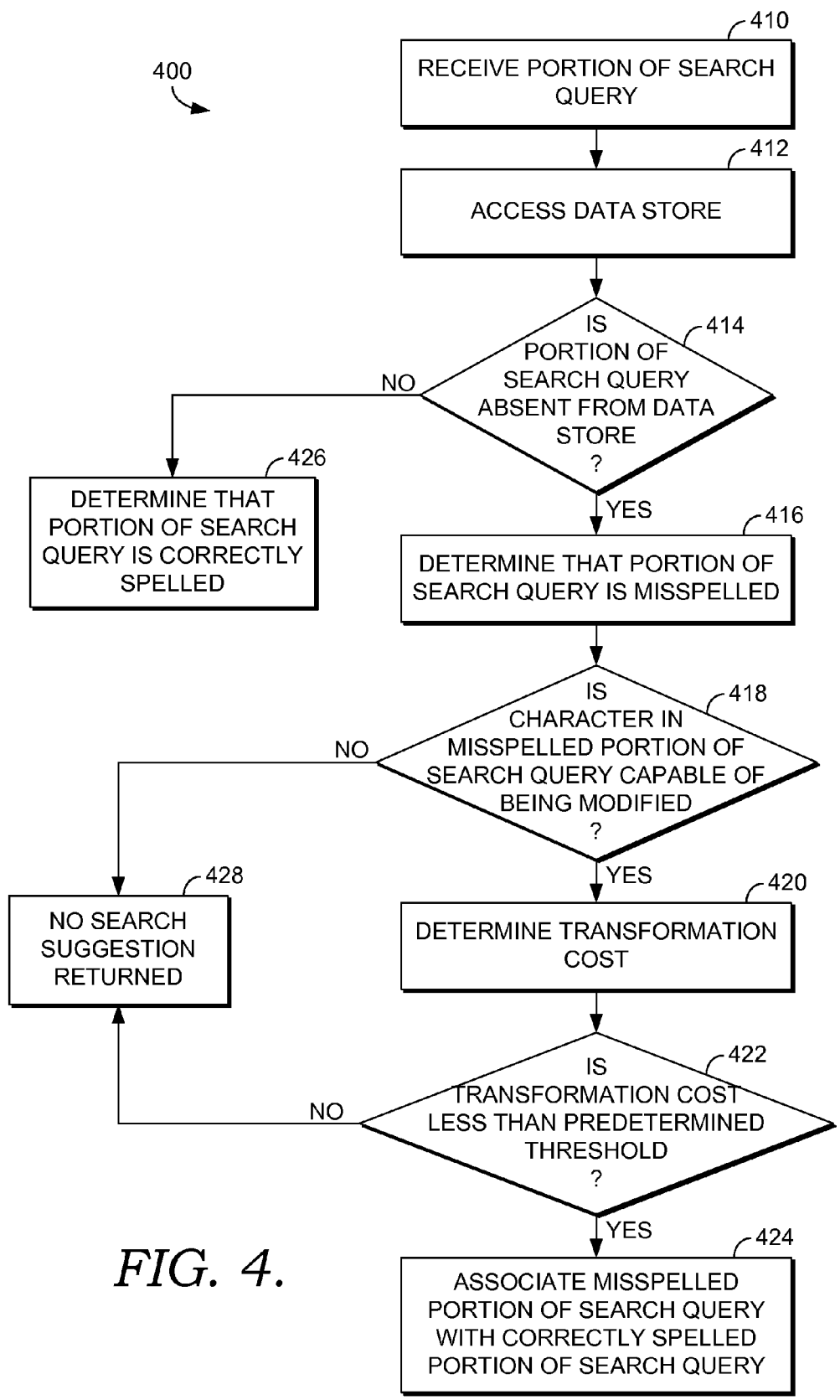
FIG. 4 depicts a flow diagram that illustrates a method of associating a misspelled portion of a search query with a correctly spelled portion of a search query in accordance with an embodiment of the present invention.

Turning now to FIG. 4, a flow diagram is depicted illustrating a method 400 of associating a misspelled portion of a search query with one or more correctly spelled portions of search queries. At step 410, a portion of a search query is received, and, at step 412, a data store is accessed. The data store comprises a plurality of commonly encountered misspelled portions of search queries and misspelled complete search queries. The data store also comprises a plurality of correctly spelled search queries both partial and complete.

At step 414 a determination is made as to whether the portion of the search query is absent from the data store. If the portion of the search query is absent from the data store, then, at step 416, it is determined that the portion of the search query is a misspelled portion of a search query. Even more, since the data store comprises commonly encountered misspelled search queries as well as correctly spelled search queries, the absence of the portion of the search query from the data store may indicate that the portion of the search query is a infrequently encountered misspelling that requires dynamic correction in order to provide the user with relevant search suggestions.

At step 418 a determination is made as to whether a character in the misspelled portion of the search query is capable of being modified to create one or more correctly spelled portions of search queries. This determination may be based on, for example, an edit distance between the inputted character and a character in a correctly spelled portion of a search query. Modifications may include removing the character, replacing the character with a different character, or adding a character. This determination is made for each character that comprises the misspelled portion of the search query. Further, although one character may be determined as not being capable of being modified, additional characters in the misspelled portion of the search query may be determined as being capable of being modified.

After determining that a character is capable of being modified, then, at step 420, a transformation cost is determined for each of the modifications. A transformation cost may be related to, for example, a likelihood or probability that the user intended to input a different character other than the inputted character. Factors that influence the transformation cost may include edit distance, character combinations, the presence or absence of punctuation, numbers, symbols in the misspelled portion of the search query, and the like.

At step 422, a determination is made as to whether a transformation cost for a particular modification is below a predetermined threshold. In one aspect of the invention, the threshold may vary depending on the position of the character being modified. A character that appears later in the misspelled portion of the search query may have a greater threshold than a character appearing near the beginning of the search query. This is because misspellings that occur later in a search query have less of an impact on the meaning of the search query than a misspelling near the beginning of the search query.

If, at step 422, it is determined that the transformation cost for a particular character is below a predetermined threshold, then, at step 424, the misspelled portion of the search query is associated with the one or more correctly spelled portions of search queries that were generated by the modification.

If, however, it is determined at step 414 that the portion of the search query is present in the data store, then the portion of the search query is determined to be a correctly spelled portion of a search query at step 426. The correctly spelled portion has associated search suggestions stored, for example, in the data store. These search suggestions are subsequently presented to the user.

Continuing, if it is determined at step 418 that none of the characters in the misspelled portion of the search query are capable of being modified, then, at step 428, no search suggestions are returned for the search query. As well, if, at step 422, it is determined that the transformation cost associated with modifying the misspelled portion of the search query to a correctly spelled portion of a search query is greater than a predetermined threshold, then, at step 428, no search suggestions are returned to the user for the correctly spelled portion of the search query.

Figure 5:
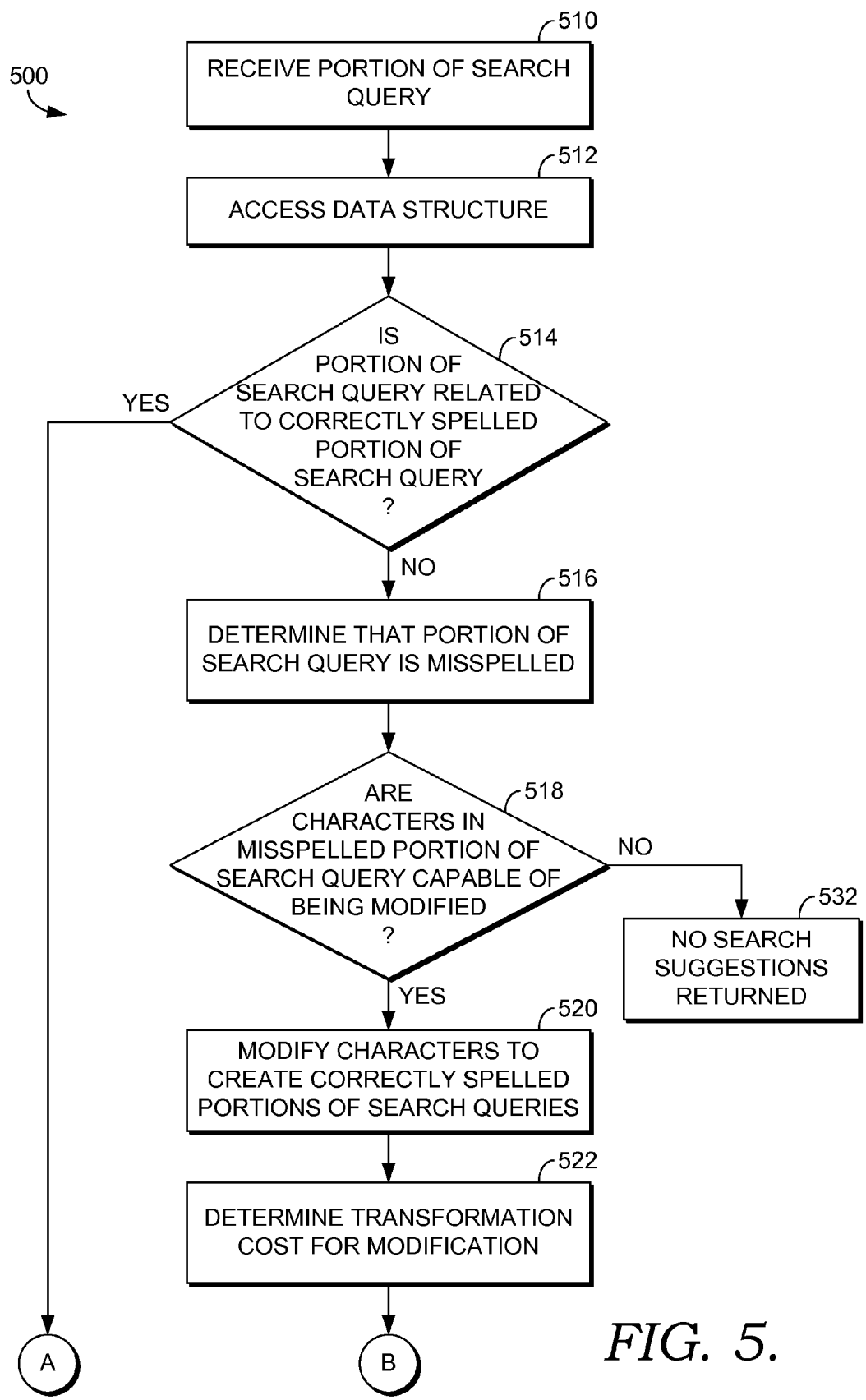
FIG. 5 depicts a flow diagram that illustrates a method of determining and ranking a set of search suggestions for a misspelled portion of a search query in accordance with an embodiment of the present invention.
Figure 5:
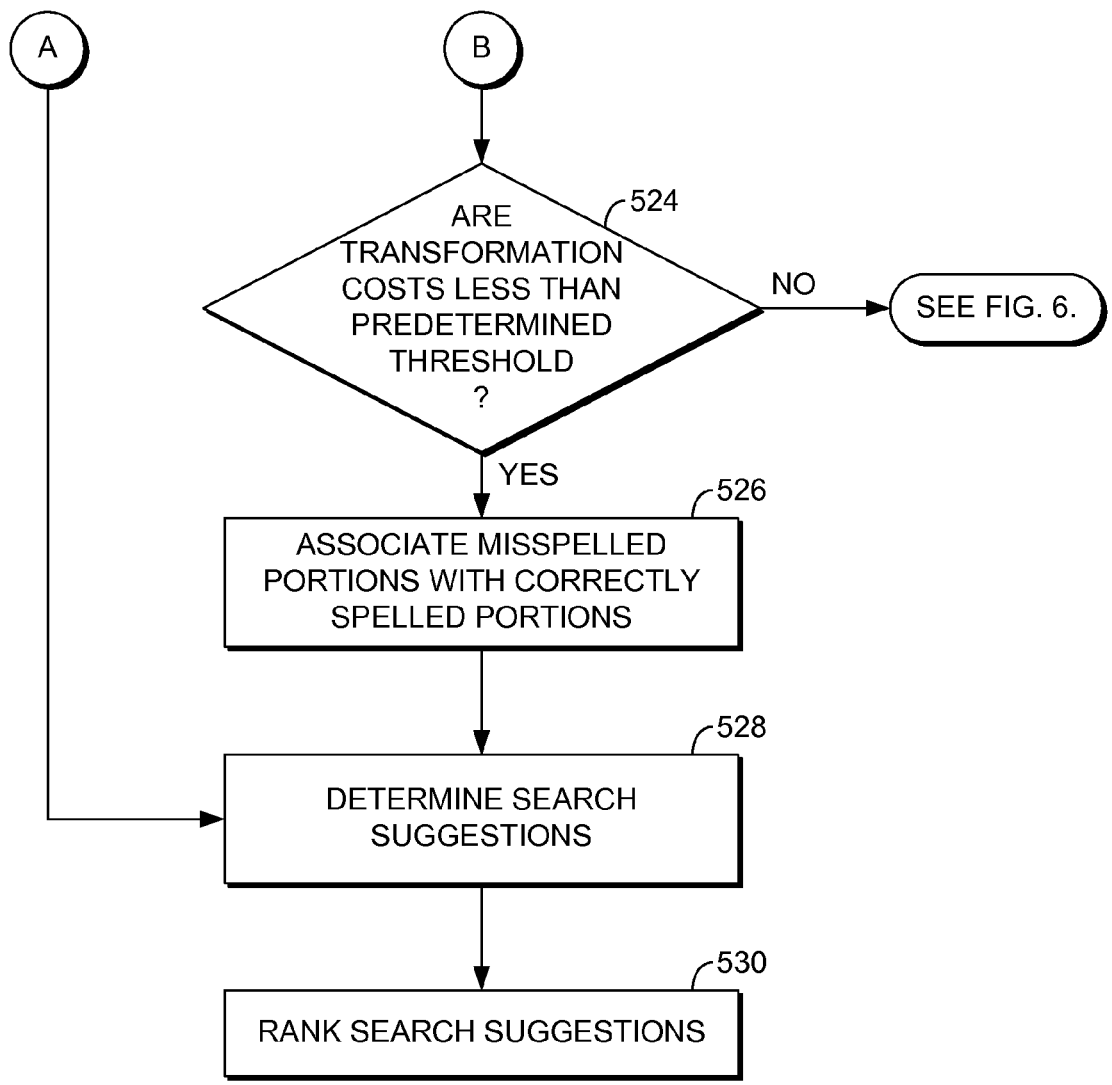

Turning now to FIG. 5, a flow diagram is depicted illustrating a method 500 for dynamically correctly a misspelled portion of a search query. At step 510, a portion of a search query is received from a user. In one aspect, the user inputs the query using a keyboard (for example, a QWERTY keyboard). At step 512, a data structure is accessed. The data structure comprises a plurality of stored relationships between misspelled portions of search queries and associated correctly spelled portions of search queries. The misspelled portions of search queries in the data structure include commonly encountered misspellings.

At step 514, and using the data structure, a determination is made as to whether the portion of the search query received at step 510 is related to correctly spelled portions of search queries in the data structure. If the portion of the search query is not related to correctly spelled portions of search queries in the data structure then, at step 516, a determination is made that the portion of the search query comprises a misspelled portion of a search query.

At step 518, a determination is made as to whether characters in the misspelled portion of the search query are capable of being modified. In one aspect of the invention, it may be determined that the first one or two characters of the search query are not capable of being modified, because changing these characters may alter the meaning of the search query by too great of a margin. As well, a character may be determined as not capable of being modified if the modification results in a search query that lacks any similarity to the misspelled portion of the search query.

If, at step 518, it is determined that characters in the misspelled portion of the search query are capable of being modified then, at step 520, the characters are modified using a trie data structure to create one or more correctly spelled portions of search queries. At step 522, a transformation cost is determined for each character modification, and, at step 524, a determination is made as to whether each of the transformation costs is less than a predetermined threshold. If each of the transformation costs is less than the predetermined threshold then, at step 526, the misspelled portion of the search query is associated with the one or more correctly spelled portions of search queries.

At step 528, search suggestions corresponding to the one or more correctly spelled portions of search queries are determined. The search suggestions may be stored in, for example, the data structure. At step 530, the search suggestions are ranked according to a frequency of use of each search suggestion. As well, the search suggestions are ranked according to a transformation cost associated with the correctly spelled portion of a search query that corresponds to the search suggestion. After the search suggestions are ranked, the search suggestions are presented to the user.

If it is determined at step 514 that the portion of the search query is related to a correctly spelled portion of a search query in the data structure, then, at step 528, search suggestions corresponding to the portion of the search query are determined. Continuing, at step 530, the search suggestions are ranked based on, for example, a frequency of use.

At step 518, if it is determined that none of the characters in the misspelled portion of the search query are capable of being modified, then, at step 532, no search suggestions are presented to the user. However, it should be noted, that even if only one character is determined to be capable of being modified, the method proceeds as outlined above.

Figure 6:
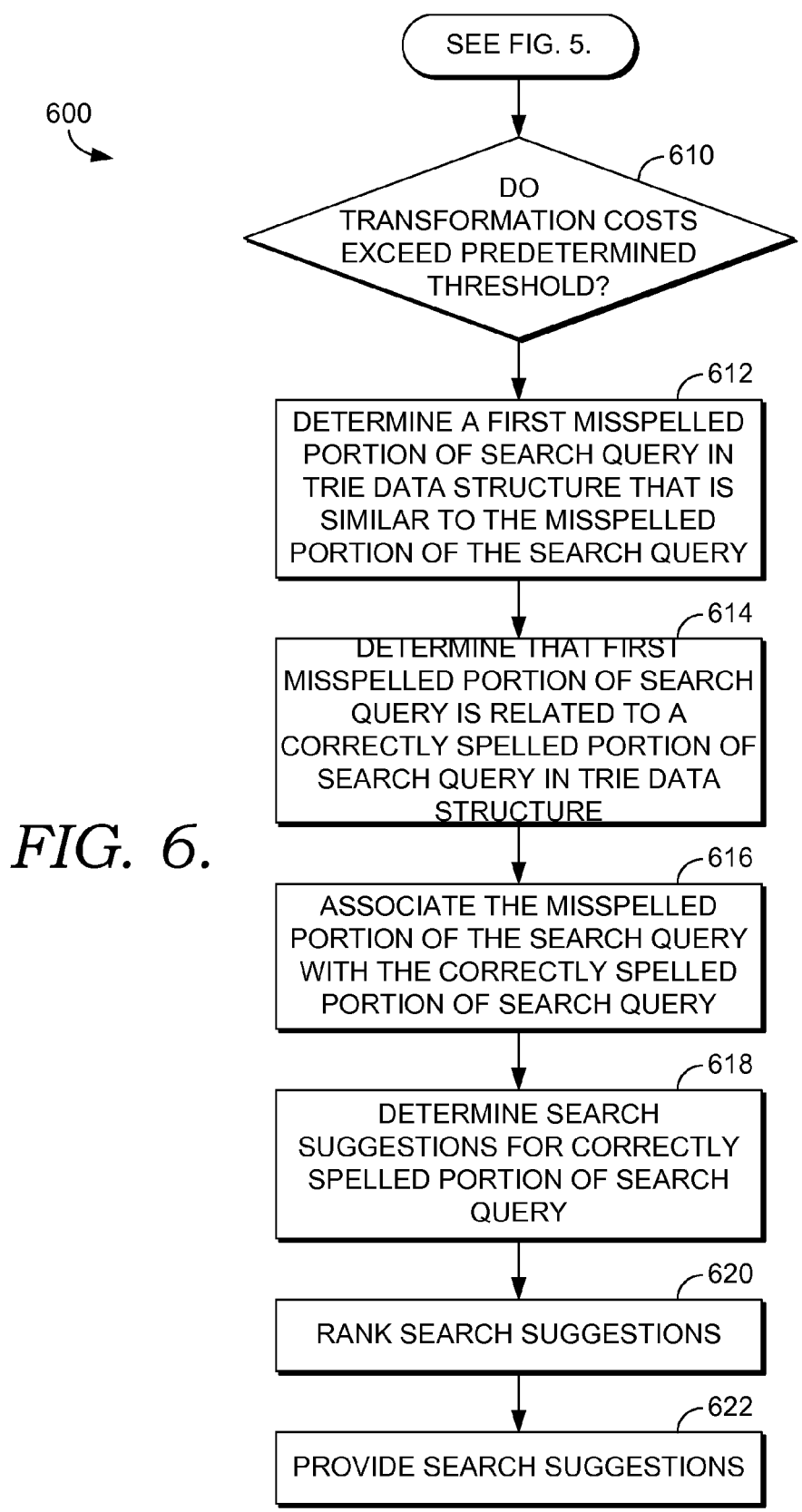
FIG. 6 depicts a flow diagram that illustrates a method of determining a set of search suggestions for a misspelled portion of a search query with a high transformation cost in accordance with an embodiment of the present invention.

If, at step 524, it is determined that the transformation cost for modifying a character is above a predetermined threshold, an alternative method may be utilized to dynamically determine a spelling correction for the misspelled portion of the search query. This method is outlined in FIG. 6 which is a continuation of FIG. 5. FIG. 6 depicts a flow diagram illustrating a method 600 of determining a set of search suggestions for a misspelled portion of a search query with a high transformation cost. The method 600 outlined in FIG. 6 is designed to provide potentially relevant search suggestions to a user in the face of high transformation costs.

At step 610, a determination is made as to whether a transformation cost exceeds a predetermined threshold. If so, then, at step 612 and using a trie data structure, a determination is made that a first misspelled portion of a search query in the trie data structure is similar to the misspelled portion of the search query. As mentioned above, in one aspect of the invention, the trie data structure may comprise one or more misspelled portions of search queries in addition to the correctly spelled search queries.

At step 614, it is determined that the first misspelled portion of the search query in the trie data structure is related or linked to a first correctly spelled portion of a search query in the trie data structure. Again, when the trie data structure is created, one or more misspelled search queries may be related or linked to one or more correctly spelled search queries. At step 616, the misspelled portion of the search query is associated with the first correctly spelled portion of the search query. At step 618, search suggestions are determined for the first correctly spelled portion of the search query.

Continuing, at step 620, the search suggestions are ranked. In one aspect, the search suggestions determined using the method 600 are aggregated with the search suggestions determined using the method 500. Those search suggestions determined using the method 600 may be ranked lower than the search suggestions determined using the method 500. This is because of the higher transformation cost associated with the search suggestions determined by the method 600. At step 622, the search suggestions are presented to the user.

Figure 8:
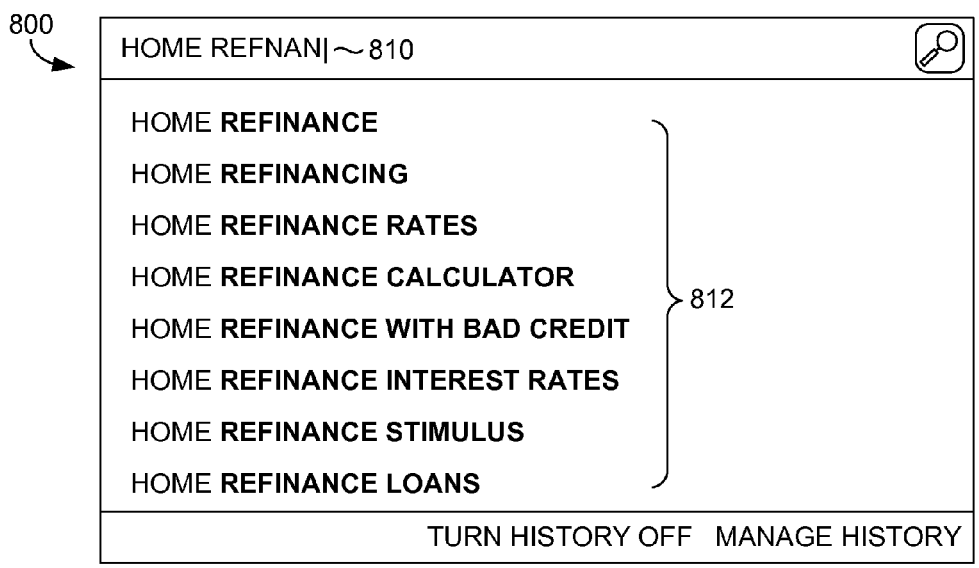
FIG. 8 depicts an exemplary user interface illustrating a misspelled portion of a search query and a set of search suggestions in accordance with an embodiment of the present invention.

Turning now to FIG. 8, an exemplary user interface 800 is depicted illustrating a misspelled portion of a search query and a set of search suggestions. The user interface 800 may be provided as part of a search engine page. The user inputs a portion of a search query in an area 810. As can be seen, the user misspelled the word refinance—"refnan." Using the methods outlined above, the misspelling is dynamically corrected and a list of search suggestions 812 is presented to the user.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. One or more computer-readable storage media having computer-executable instructions embodied thereon that, when executed, facilitate a method of providing relevant search suggestions, the method comprising:

receiving a portion of a search query from a user;

accessing a data store, the data store comprising a plurality of correctly spelled complete search queries, a plurality of correctly spelled portions of search queries, and a plurality of search suggestions;

using the data store, determining that the portion of the search query is associated with a first set of search suggestions;

determining that the portion of the search query is a misspelled portion of a search query when the first set of search suggestions is less than a predetermined number;

dynamically determining a first set of correctly spelled portions of search queries that are similar to the misspelled portion of the search query;

creating an association between the misspelled portion of the search query and the set of correctly spelled portions of search queries;

using the data store, determining a second set of search suggestions associated with the set of correctly spelled portions of search queries, wherein the set of correctly spelled portions of search queries have been associated with the misspelled portion of the search query;

aggregating the first set of search suggestions and the second set of search suggestions to create a third set of search suggestions, wherein the first set of search suggestions is associated with the misspelled portion of the search query and the second set of search suggestions is associated with the set of correctly spelled portions of search queries that have been associated with the misspelled portion of the search query;

ranking the third set of search suggestions based on a frequency of use of each of the search suggestions within the third set of search suggestions and on a transformation cost of associating the misspelled portion of the search query with the set of correctly spelled portions of search queries; wherein the transformation cost is a numerical value that is inversely proportional to a probability that the user intended to input a character other than the character in the misspelled portion of the search query; and providing the third set of search suggestions to a search engine page.

2. The media of claim 1, wherein the portion of the search query received from the user is received via the user inputting the portion of the search query using a keyboard.

3. The media of claim 2, wherein the misspelled portion of the search query is misspelled due to a typographical error.

4. The media of claim 1, wherein the transformation cost is greater if the typographical error involves characters that are spaced far apart on the keyboard.

5. The media of claim 1, wherein the ranking of a search suggestion within the third set of search suggestions is inversely proportional to the transformation cost.

6. The media of claim 1, wherein the ranking of a search suggestion within the third set of search suggestions is directly proportional to a frequency of use of the search suggestion.

7. One or more computer-readable storage media having computer-executable instructions embodied thereon that, when executed, facilitate a method of associating one or more correctly spelled portions of search queries with a misspelled portion of a search query, the method comprising:

receiving a portion of a search query from a user, the portion of the search query comprising a first character and a second character, wherein the second character follows the first character;

accessing a data store, the data store comprising a plurality of correctly spelled complete search queries, misspelled complete search queries, correctly spelled portions of search queries, and misspelled portions of search queries;

determining that the portion of the search query is absent from the data store;

determining that the portion of the search query is a misspelled portion of a search query when the portion of the search query is absent from the data store;

dynamically determining that the second character is capable of being modified to create a first correctly spelled portion of a search query, wherein the first correctly spelled portion of a search query is in the data store;

dynamically determining a first transformation cost for modifying the second character to create the first correctly spelled portion of a search query, the first transformation cost being inversely proportional to a probability that the user intended to input the first correctly spelled portion of a search query;

dynamically determining that the first transformation cost is less than a predetermined threshold;

dynamically associating the misspelled portion of the search query with the first correctly spelled portion of a search query when the first transformation cost is less than the predetermined threshold dynamically determining a first set of search suggestions corresponding to the first correctly spelled portion of the search query;

ranking the first set of search suggestions based on the first transformation cost and a frequency of use of each search suggestion in the first set of search suggestions; and providing the first set of search suggestions to a search engine page.

8. The media of claim 7, wherein the misspelled portion of the search query further comprises a third character, wherein the third character follows the second character.

9. The media of claim 8, further comprising:

dynamically determining that the third character is capable of being modified to create a second correctly spelled portion of a search query, wherein the second correctly spelled portion of a search query is in the data store;

dynamically determining a second transformation cost for modifying the third character to create the second correctly spelled portion of a search query;

dynamically determining that the second transformation cost is less than a second predetermined threshold, the second predetermined threshold being greater than the first predetermined threshold; and dynamically associating the misspelled portion of the search query with the second correctly spelled portion of a search query when the second transformation cost is less than the second predetermined threshold.

10. The media of claim 9, further comprising:

dynamically determining a second set of search suggestions corresponding to the second correctly spelled portion of a search query;

aggregating the first set of search suggestions and the second set of search suggestions to create an aggregated set of search suggestions;

ranking the aggregated set of search suggestions based on the first transformation cost, the second transformation cost, and a frequency of use of each search suggestion in the aggregated set of search suggestions; and providing the ranked aggregated set of search suggestions to a search engine page.

11. The media of claim 10, wherein the ranked aggregated set of search suggestions is presented to a user.

12. One or more computer-readable storage media having computer-executable instructions embodied thereon that, when executed, facilitate a method of dynamically correcting a misspelled portion of a search query, the method comprising:

receiving a portion of a search query from a user, wherein the portion of the search query begins with a first character and comprises one or more additional characters;

accessing a data structure, the data structure comprising a plurality of stored relationships between misspelled portions of search queries and associated correctly spelled portions of search queries;

using the data structure, determining that the portion of the search query is not related to an associated correctly spelled portion of a search query;

determining that the portion of the search query is a misspelled portion of a search query when the portion of the search query is not related to an associated correctly spelled portion of a search query;

beginning with the one or more additional letters that comprise the misspelled portion of the search query, determining that each character of the one or more additional characters is capable of being modified to create one or more correctly spelled portions of search queries;

incident to determining that the each character of the one or more additional characters is capable of being modified to create the one or more correctly spelled portions of search queries, determining a transformation cost for modifying the each character of the one or more additional characters, wherein the transformation cost is a numerical value that is inversely proportional to a probability that the user intended to input a character other than the character in the misspelled portion of the search query;

determining that each of the transformation costs is below a predetermined threshold;

associating the misspelled portion of the search query with the one or more correctly spelled portions of search queries;

determining one or more search suggestions associated with the one or more correctly spelled portions of search queries;

ranking the one or more search suggestions based on a frequency of use of each search suggestion in the one or more search suggestions and on the transformation cost for modifying the each character of the one or more additional characters; and providing the one or more search suggestions to a search engine page, wherein the one or more search suggestions are presented in ranked order.

13. The media of claim 12, wherein determining that the portion of the search query is misspelled further comprises determining that the portion of the search query received from the user is absent from the data structure.

14. The media of claim 12, wherein the data structure further comprises a plurality of search suggestions associated with the correctly spelled portions of search queries.

15. The media of claim 12, wherein determining that the each character of the one or more additional characters is capable of being modified to create the one or more correctly spelled portions of search queries comprises using a trie data structure.

16. The media of claim 15, wherein the trie data structure is generated using data within the data structure.

17. The media of claim 15, wherein the trie data structure comprises a plurality of nodes and a plurality of paths, wherein each node represents a character.

18. The media of claim 17, wherein traversal of one of the plurality of paths generates a correctly spelled portion of a search query.

19. The media of claim 12, wherein the each character can be modified by adding an additional character, removing the each character, or replacing the each character with a new character.

* * * * *